3,015,572
DRY POTENTIAL ADHESIVE COMPOSITIONS
James P. Casey and Ellis R. Lehman, Decatur, Ill., assignors to A. E. Staley Manufacturing Company, Decatur, Ill., a corporation of Delaware
No Drawing. Filed Apr. 2, 1958, Ser. No. 725,780
8 Claims. (Cl. 106—197)

This invention relates broadly to dry potential adhesive compositions containing a major proportion of ungelatinized starch and a minor proportion of a material which is capable of dissolving or dispersing in cold water to yield a viscous solution or dispersion. More specifically, the invention relates to such compositions containing sodium carboxymethylcellulose as the minor component soluble in water.

The dry compositions contemplated by this invention are particularly useful as potential adhesives in the manufacture of corrugated paper board. For this purpose, they need only to be stirred with water below the pasting temperature of starch until the minor component has dissolved. The resultant stabilized slurry or suspension of ungelatinized starch granules in a viscous liquid carrier medium is then ready for use in the manufacture of corrugated paper board as described in United States Patents 2,051,025 and 2,102,937 and at pages 596–598 in "Chemistry and Industry of Starch," second edition, edited by R. W. Kerr, published by Academic Press, Incorporated. As explained in the foregoing references, a suspension of ungelatinized starch granules in a suitably viscous medium or carrier is an efficient corrugating adhesive composition. Application of sufficient heat to the plies, which have been properly coated with the suspension, binds them together firmly and quickly. The suspended starch granules swell greatly at their gelatinizing temperature, soaking up the available free water and producing a strong adhesive bond between the plies. Commercially, the preferred carrier or suspending medium for the ungelatinized starch portion of starchy corrugating adhesive compositions is a thin paste of starch itself. Non-starchy carriers such as the glutinous components of cereal flours, bentonite clay, natural vegetable gum, and gelatin are described in United States Patent 2,212,557.

It is common commercial practice to prepare the aqueous adhesive composition at the corrugating plant by first preparing the carrier medium and then mixing in the other ingredients, including the ungelatinized starch portion. If the carrier medium is an aqueous starch paste, it is commonly made by appropriate heating of a starch slurry. The heated paste must be cooled below the starch gelatinizing temperature before the unpasted starch portion is added. Thus, both heating and cooling facilities are required in this method.

Although United States Patent 2,212,557 and other prior art teaches the use of non-starchy carrier materials, including some which are soluble in cold water, none have been disclosed with the advantages of sodium carboxymethylcellulose as a carrier material. The prior art carrier materials which are soluble in cold water do not readily dissolve in cold water to yield a smooth viscous solution. In general, they require prolonged soaking and mixing with water, and frequently produce lumpy or non-uniform dispersions.

We have discovered that certain grades of sodium carboxymethylcellulose are particularly suitable as carrier maerials. They dissolve quickly in cold water to yield the necessary viscous carrier medium. Furthermore, we unexpectedly discovered that granular starch facilitates the non-lumping solution of sodium carboxymethylcellulose in cold water. Aqueous corrugating adhesive compositions prepared from our dry composition have the following advantages over the conventional aqueous compositions as described, for example, in United States Patent 2,102,937:

(1) No heating and cooling of a starch paste, with the requisite temperature control equipment, are needed. This reduces the necessary adhesive preparation equipment to a minimum of one tank equipped with agitator. It also permits corrugated paperboard manufacturers who previously used silicate adhesive alone to shift to a starch adhesive without altering or adding to their present gluemaking facilities.

(2) Time required to prepare a batch of adhesive is greatly reduced. Cooking and cooling of a starch paste are eliminated. Also eliminated are the prolonged soaking and the stirring of the carrier material with water as required with natural gum and gelatin.

(3) The viscosity of the aqueous corrugating composition made from our dry composition is more stable than the viscosity of the conventional liquid composition. Viscosity stability is an important property of the liquid composition, because small changes in viscosity often adversely affect the operation of the paper board machine, as well as the quality of the paper board. The viscosity declines markedly during recirculation of the composition through the paper board machine, when the carrier medium is a starch paste or a solution of a vegetable gum. Accordingly, the operator must be constantly alert to make the necessary corrections in viscosity; otherwise the quantity and quality of product will decline.

The dry compositions of our invention are useful in the preparation of all types of liquid starchy corrugating adhesive compositions. The liquid corrugating adhesive compositions may be acidic, neutral, or alkaline. They may yield water-resistant corrugated board or the so-called domestic or non-water resistant product. Preparation of non-water resistant liquid adhesive compositions is described in United States Patents 2,051,025 and 2,102,937. Liquid starchy adhesive compositions useful in the preparation of water resistant corrugated paper board are described in U. S. Patents 2,529,581; 2,626,934, and 2,650,205. The water-resistant adhesives all contain a soluble material which increases the water resistance of the bond between the paper plies, essentially a film or thin layer of dried starch paste. Two classes of such materials have been commercially successful. One consists of resorcinol-formaldehyde condensation products or mixtures of resorcinol and formaldehyde, and the other consists of urea-formaldehyde condensation products. Liquid corrugating adhesive compositions containing the former as starch-insolubilizing agent must be alkaline or contain a material which produces the necessary alkalinity when the bond is formed by heating the applied composition, and compositions containing the latter as starch insolubilizer must be acidic or contain a suitable acid-generating catalyst.

Our invention embraces dry mixtures of starch and sodium carboxymethylcellulose containing additional materials useful in the preparation of water-resistant corrugating adhesive compositions such as those described above. Examples of the additional materials are resorcinol, water-soluble resorcinol-formaldehyde condensation product, water-soluble urea-formaldehyde condensation product, and a water-soluble ketone-aldehyde condensation product.

It is preferred that the liquid starchy corrugating adhesive compositions, consisting essentially of ungelatinized starch suspended in a viscous liquid medium, be rather strongly alkaline. Alkalinity reduces the starch gelatinization temperature, thus increasing machine output for a given heating capacity. It also improves the tackiness of the final adhesive formed between the heated plies, and reduces corrosion of the equipment. On the other hand, useful starchy corrugating adhesive compositions can be prepared which are neutral as well as acidic. As mentioned above, our invention is useful in the preparation of such compositions whether they are neutral, acid or alkaline.

A dry composition illustrating our invention is prepared as follows: 2000 lbs. of commercial unmodified corn starch is mixed thoroughly with 100 lbs. of powdered borax and 60 lbs. of powdered sodium carboxymethylcellulose. The sodium carboxymethylcellulose is one having a solution viscosity of 1800 centipoises measured on a 1% water solution at 77° F. It is not essential that the borax and sodium carboxymethylcellulose be as finely divided as the starch, but it is preferable that neither of these two components be so coarse as to segregate readily during storage and transportation of the dry product. Also, as mentioned earlier, distribution of the sodium carboxymethylcellulose throughout the starch prevents lumping of the former when the composition is stirred into water.

A typical liquid corrugating adhesive composition is prepared from the foregoing dry composition as follows: Dissolve 15 lbs. of dry caustic soda in 305 gallons of water at 105° F., then stir in 540 lbs. of the dry composition. Stir the mixture for 30 minutes to dissolve the borax and sodium carboxymethylcellulose. The resultant aqueous composition, consisting of an alkaline slurry of ungelatinized starch in a viscous solution of the sodium carboxymethylcellulose, is ready for use as an adhesive in the manufacture of corrugated paper board. The paper board will not be water resistant.

The ratio of sodium carboxymethylcellulose to starch in the dry compositions of our invention depends upon the solution viscosity of the former. The higher the solution viscosity, the less the proportion required to impart the necessary viscosity to the aqueous carrier medium. Cost of the sodium carboxymethylcellulose portion soon becomes an over-riding factor with low solution viscosity products. We have found that the commercially useful ratio of sodium carboxymethylcellulose to starch will fall within the limits of 0.005 to 0.100.

Another dry composition illustrating our invention is a mixture of 500 pounds of commercial unmodified dry corn starch, 14 pounds of powdered sodium carboxymethylcellulose, and 30 pounds of granulated resorcinol. The sodium carboxymethylcellulose is a commercial product having a solution viscosity of 1800 centipoises measured on a 1% water solution at 77° F.

A liquid corrugating adhesive composition is easily made from the foregoing dry composition by adding it to 300 gallons of water at 100° F. containing in solution 9 pounds of sodium hydroxide and 20 pounds of paraformaldehyde, and stirring the mixture for 60 minutes. The resulting aqueous composition, consisting of an alkaline slurry of ungelatinized starch granules in a viscous solution of sodium carboxymethylcellulose, resorcinol, and paraformaldehyde, is ready for use in the manufacture of water resistant corrugated paper board.

Still another dry composition illustrating our invention is a mixture of 600 pounds of commercial unmodified dry corn starch, 14 pounds of powdered sodium carboxymethylcellulose, and 90 pounds of granulated Urac-110 (a water soluble ureaformaldehyde condensation product). The sodium carboxymethylcellulose has a solution viscosity of 1800 centipoises measured on a 1% water solution at 77° F.

A liquid corrugating adhesive composition is obtained when the foregoing dry composition is stirred for 30 minutes with 240 gallons of water at 100° F. containing 25 pounds of ammonium chloride. The aqueous composition thus obtained, consisting of an acidic slurry of ungelatinized starch granules in a viscous solution of sodium carboxymethylcellulose and urea-formaldehyde condensation product, is ready for use in the manufacture of water-resistant corrugated paper board.

Other brands of urea-formaldehyde water soluble condensation products may be used in the foregoing compositions. For example, Uformite 505, a brand of urea-formaldehyde product is satisfactory. And, as is known in the art, best results from the standpoint of water resistance are obtained when the liquid starchy adhesive compositions containing urea-formaldehyde products are moderately acidic. Preferred pH range is 4–5, and ammonium chloride is widely used to produce the desired acidity. Other water-soluble acidic substances may be used in place of ammonium chloride.

In our dry compositions designed for acidic water-resistant liquid compositions and based on urea-formaldehyde products, 15% of urea-formaldehyde product based on starch is a preferred ratio, with 10–30% being the practical range.

Borax is a preferred component in our dry composition, because of the beneficial influence it has on the paste properties of starch. Useful and satisfactory results are obtained, however, if it is omitted. It is our experience that the useful range of borax content in the dry compositions is from 0.5 to 8.0%.

Although corn starch is the preferred starch component of our dry compositions because of its abundance and low cost, other starches may be used successfully. Among these are those obtained from wheat, potatoes, rice, sorghum and tapioca. Also, starches which have been modified by heat, or moisture, or chemicals, may replace ordinary or unmodified starch in our composition, provided they have retained their granular form and the ability to swell and to gelatinize in hot water.

We claim:
1. A dry potential adhesive adapted to be mixed with water to form a corrugated-board adhesive of the type containing ungelatinized starch suspended in a carrier, said potential adhesive consisting essentially of ungelatinized starch and a granular form of sodium carboxymethylcellulose as carrier wherein the ratio of sodium carboxymethylcellulose to starch lies within the range of 0.005 to 0.10.

2. A dry potential adhesive adapted to be mixed with water to form a corrugated-board adhesive of the type containing ungelatinized starch suspended in a carrier, said potential adhesive consisting essentially of ungelatinized starch and a granular form of sodium carboxymethylcellulose as carrier and including also a granular form of borax, the ratio of sodium carboxymethylcellulose to starch lying in the range of 0.005 to 0.10.

3. A dry potential adhesive adapted to be mixed with water to form a corrugated-board adhesive of the type containing ungelatinized starch suspended in a carrier, said potential adhesive consisting essentially of ungelatinized starch and a granular form of sodium carboxymethylcellulose as carrier and including also a granular form of borax, the percentages of sodium carboxymethyl cellulose and borax based on starch lying within the range of 0.5 to 10 and 0.5 to 8, respectively.

4. A dry potential adhesive adapted to be mixed with water to form a corrugated-board adhesive of the type containing ungelatinized starch suspended in a carrier, said potential adhesive consisting essentially of ungelatinized starch, a granular form of sodium carboxymethylcellulose as carrier and a granular form of a reagent adapted to impart water-resistance to the adhesive bond by chemical reaction, said reagent being selected from the group consisting of resorcinol and a water-soluble urea-formaldehyde condensation product, the ratio of sodium carboxy methyl cellulose to starch lying in the range of 0.005 to 0.10.

5. The improvement of claim 4 in which the reagent is resorcinol and in which the adhesive is alkaline when the ungelatinized starch is gelatinized between the plies of the paperboard.

6. The improvement of claim 4 in which the reagent is a water-soluble urea-formaldehyde condensation product.

7. In the manufacture of corrugated paperboard wherein an amylaceous adhesive is prepared by mixing an aqueous suspension of ungelatinized starch with a separately prepared aqueous carrier therefor and an adhesive bond is developed by gelatinizing the ungelatinized starch between the plies of said board, the improvement that comprises the steps of dispersing in water a dry composition consisting essentially of ungelatinized starch and a granular form of sodium carboxymethylcellulose as carrier to form said adhesive and applying the dispersion to at least one of the plies of said paper board before gelatinizing the starch, the ratio of sodium carboxymethylcellulose to starch lying in the rage of 0.005 to 0.10.

8. In the manufacture of corrugated paperboard wherein an amylaceous adhesive is prepared by mixing an aqueous suspension of ungelatinized starch with a separately prepared aqueous carrier therefor and an adhesive bond is developed by gelatinizing the ungelatinized starch between the plies of said board, the improvement comprising the steps of dispersing in water a dry composition that consists essentially of ungelatinized starch, a granular form of borax and a granular form of sodium carboxymethylcellulose to form said adhesive and applying said adhesive to at least one of the plies of said paperboard before gelatinizing the starch, the ratio of said sodium carboxymethylcellulose to starch lying within the range of 0.005 to 0.10, the percentage of borax based on starch lying within the range of 0.5 to 8.

References Cited in the file of this patent

UNITED STATES PATENTS

| | | |
|---|---|---|
| 2,212,557 | Bauer | Aug. 27, 1940 |
| 2,487,766 | Schmidt | Nov. 8, 1949 |
| 2,650,205 | Kesler et al. | Aug. 25, 1953 |
| 2,764,568 | Landis | Sept. 25, 1956 |
| 2,937,105 | Cazemier | May 17, 1960 |

OTHER REFERENCES

Industrial and Engineering Chemistry (I), vol. 44, No. 12, December 1952, pages 2803–2812.

Industrial and Engineering Chemistry (II), vol. 37, No. 10, October 1945, pages 943–947.

Ott et al.: High Polymers, vol. V, part II, 1954, page 1020.